(12) United States Patent
Kajino et al.

(10) Patent No.: US 10,024,372 B2
(45) Date of Patent: Jul. 17, 2018

(54) WORK VEHICLE

(71) Applicant: ISEKI & CO., LTD., Ehime-ken (JP)

(72) Inventors: Yutaka Kajino, Ehime-ken (JP);
Tomoyuki Ishida, Ehime-ken (JP);
Hiroto Sawaki, Ehime-ken (JP)

(73) Assignee: ISEKI & CO., LTD. (JP)

( * ) Notice: Subject to any disclaimer, the term of this patent is extended or adjusted under 35 U.S.C. 154(b) by 0 days.

(21) Appl. No.: 15/052,245

(22) Filed: Feb. 24, 2016

(65) Prior Publication Data

US 2016/0252144 A1 Sep. 1, 2016

(30) Foreign Application Priority Data

Feb. 27, 2015 (JP) .................................. 2015-038906

(51) Int. Cl.
*B60W 10/02* (2006.01)
*F16D 48/00* (2006.01)
(Continued)

(52) U.S. Cl.
CPC .............. *F16D 48/00* (2013.01); *A01B 71/02* (2013.01); *B60R 25/04* (2013.01); *B60R 25/06* (2013.01);
(Continued)

(58) Field of Classification Search
CPC ... F16D 48/00; B60R 25/06; B60R 2325/308; B60W 30/18054; B60W 2050/0064;
(Continued)

(56) References Cited

U.S. PATENT DOCUMENTS 5,835,868 A * 11/1998 McElroy ............... B60R 25/005
180/168
6,060,981 A 5/2000 Landes
(Continued)

FOREIGN PATENT DOCUMENTS

DE 10 2008 047425 A1 4/2010
EP 0879743 A2 11/1998
(Continued)

OTHER PUBLICATIONS

English translation of JP2014051194A, translationportal.epo.org, Jul. 13, 2017.*
(Continued)

*Primary Examiner* — Roger L Pang
(74) *Attorney, Agent, or Firm* — Finnegan, Henderson, Farabow, Garrett & Dunner LLP

(57) ABSTRACT

A work vehicle with a travel control device that allows stationary work without disabling a theft-prevention state of the vehicle is provided. The work vehicle includes an engine, a power transmission device having a clutch for transmitting rotational power of the engine to drive wheels, a travel control device for controlling the clutch in the power transmission device and having a start restriction mode for restricting engagement of the clutch when electrical power is turned on, a mobile terminal configured to transmit signals for enabling and disabling the start restriction mode, and a control unit configured to transmit and receive signals to and from the mobile terminal.

8 Claims, 8 Drawing Sheets

(51) Int. Cl.
*B60R 25/06* (2006.01)
*B60W 30/18* (2012.01)
*B60R 25/04* (2013.01)
*A01B 71/02* (2006.01)
*B60W 10/10* (2012.01)
*B60W 50/00* (2006.01)

(52) U.S. Cl.
CPC . *B60W 30/18054* (2013.01); *B60R 2325/308* (2013.01); *B60W 10/02* (2013.01); *B60W 10/10* (2013.01); *B60W 30/18027* (2013.01); *B60W 2050/0064* (2013.01); *B60Y 2200/221* (2013.01); *Y10T 477/75* (2015.01); *Y10T 477/78* (2015.01)

(58) Field of Classification Search
CPC ............... B60W 10/02; B60W 10/10; B60W 30/18027; B60Y 2200/221; Y10T 477/75; Y10T 477/78
USPC .......................................................... 701/67
See application file for complete search history.

(56) References Cited

U.S. PATENT DOCUMENTS

| | | |
|---|---|---|
| 2005/0134115 A1 | 6/2005 | Betts, Jr. et al. |
| 2005/0227810 A1 | 10/2005 | Nakagawa et al. |
| 2016/0355186 A1* | 12/2016 | Kanitz ............... B62D 1/187 |

FOREIGN PATENT DOCUMENTS

| | | | |
|---|---|---|---|
| EP | 1209048 A1 * | 5/2002 | ............. B60R 25/06 |
| EP | 2 196 363 A1 | 6/2010 | |
| EP | 2521100 A2 | 11/2012 | |
| FR | 2558783 A1 * | 8/1985 | ............. B60R 25/06 |
| FR | 2629408 A2 | 10/1989 | |
| FR | 2767595 A1 | 2/1999 | |
| GB | 2243814 A | 11/1991 | |
| GB | 2513880 A | 11/2014 | |
| GR | 1003051 | 1/1999 | |
| JP | 2009-274632 | 11/2009 | |
| JP | 2014-51194 | 3/2014 | |
| JP | 2014051194 A | 3/2014 | |
| JP | 2016-159724 | 9/2016 | |
| WO | WO 2011088005 A1 * | 7/2011 | ............. B60R 25/04 |

OTHER PUBLICATIONS

Office Action dated Feb. 6, 2017, which was received from Korean Patent Office in Korean Application No. 10-2016-0007372, filed Jan. 21, 2016 (4 pages).
First Examination Report dated Jun. 1, 2016 issued in corresponding New Zealand Application No. 717506 (7 pages).
Extended European Search Report dated Jun. 24, 2016 in corresponding European patent application No. EP16157371.2 (6 pages).

* cited by examiner

WORK VEHICLE

CROSS REFERENCE TO RELATED APPLICATIONS

This application claims priority to Japanese Patent Application No. 2015-038906, filed Feb. 27, 2015, the disclosure of which is incorporated herein by reference in its entirety.

BACKGROUND

The present invention relates to a travel control device for a work vehicle.

In one known configuration, a work vehicle is equipped with an engine, a control unit that can communicate with a mobile terminal, and an engine start restriction that can be disabled by using the mobile terminal for access. See, e.g., Japanese Laid-open Patent Publication No. 2014-51194.

With work vehicles, there are times when a stationary implement such as a wood chipper is installed and stationary work is performed using only the power of the engine without moving the vehicle itself. In addition, restricting vehicle travel can provide the same theft-prevention function as restricting the starting of the engine.

However, in the technology described above, the engine start restriction must be disabled with a mobile terminal even if stationary work is to be performed. One object of the present invention is to provide a travel control device for a work vehicle that allows stationary work without disabling a theft-prevention state of the vehicle.

SUMMARY

According to one aspect of the present invention, in order to overcome the problems described above, a travel control device for an work vehicle is provided with an engine, is equipped with a power transmission device transmitting rotational power of the engine to drive wheels, includes a control unit controlling a clutch in the power transmission device and capable of sending and receiving signals to and from a mobile terminal, and includes a start restriction mode restricting engagement of the clutch when electrical power is turned on. The travel control device is equipped with a unit for enabling or disabling the start restriction mode, wherein the mobile terminal is provided with an operating unit for enabling and/or disabling the start restriction mode.

According to the second aspect, the clutch is a forward/reverse clutch that can be operated using a forward/reverse lever; and, when disabling the start restriction mode, engagement of the clutch is restricted if the forward/reverse lever is in a forward or a reverse position.

According to the third aspect, the clutch is a forward/reverse clutch that can be operated using a forward/reverse lever; and, if the start restriction mode is enabled when electrical power is on and the forward/reverse lever is subsequently operated to the forward or the reverse position before power is turned off, the start restriction mode is disabled.

According to the fourth aspect, if the start restriction mode is enabled when electrical power is on and the forward/reverse lever is subsequently operated to the forward or the reverse position before power is turned off, the start restriction mode is disabled.

According to the fifth aspect, when electrical power is turned on while the start restriction mode is enabled and a disable code stored in the control unit matches an authentication code stored in the mobile terminal, engagement restriction of the clutch is disabled, and, if electrical power is turned off and then back on within a predetermined time, the clutch can be engaged even if the start restriction mode is enabled.

According to the sixth aspect, when electrical power is turned on while the start restriction mode is enabled and a disable code stored in the control unit matches an authentication code stored in the mobile terminal, engagement restriction of the clutch is disabled, and, if electrical power is turned off and then back on within a predetermined time, the clutch can be engaged even if the start restriction mode is enabled.

According to the seventh aspect, when power is turned on while the start restriction mode is enabled and a disable code stored in the control unit matches an authentication code stored in the mobile terminal, engagement restriction of the clutch is disabled, and, if electrical power is turned off and then back on within a predetermined time, the clutch can be engaged even if the start restriction mode is enabled.

According to the eighth aspect, when power is turned on while the start restriction mode is enabled and a disable code stored in the control unit matches an authentication code stored in the mobile terminal, engagement restriction of the clutch is disabled, and, if electrical power is turned off and then back on within a predetermined time, the clutch can be engaged even if the start restriction mode is enabled.

According to the first aspect of the invention, if power is turned on when the start restriction mode is enabled, clutch engagement is restricted, thus preventing the work vehicle from starting and preventing theft of the vehicle.

In addition, since theft prevention is implemented by restricting vehicle travel without imposing an engine start restriction, it is possible to perform stationary tasks that do not involve movement of the work vehicle (e.g., a task that uses a stationary implement such as a wood chipper) while still providing the theft-prevention function. Furthermore, since movement of the work vehicle during a stationary task is dangerous, the restriction of vehicle travel makes it possible to perform the task safely.

Furthermore, the enabling and/or disabling of the start restriction mode can be easily performed using the mobile terminal.

According to the second aspect of the invention, the vehicle is prevented from suddenly starting up even if the start restriction mode is disabled while the forward/reverse lever is in the forward or the reverse position. Thus, in addition to the advantages provided by the first aspect of the invention, it is possible to prevent the vehicle from being unintentionally started up even if the driver disables the start restriction mode without realizing that the forward/reverse lever is in the forward or the reverse position.

According to the third aspect of the invention, the start restriction mode is disabled if, after enabling the start restriction mode, the driver tries to travel with the vehicle before power is turned off. Thus, in addition to the advantages provided by the first aspect of the invention, it is possible to prevent a situation in which, for example, the vehicle is driven onto a road after the start restriction mode is enabled, the vehicle then stalls on the road, and the vehicle cannot be driven until the start restriction mode is disabled when restarting the engine.

According to the fourth aspect of the invention, if the start restriction mode is enabled and an attempt is made to drive the vehicle again before turning off electrical power, the start restriction mode is disabled. Thus, in addition to the advantages provided by the second aspect of the invention, it is possible to prevent a situation in which, for example, the vehicle is driven onto a road after the start restriction mode is enabled, the vehicle then stalls on the road, and the vehicle cannot be driven until the start restriction mode is disabled when restarting the engine.

According to the fifth aspect of the invention, if electrical power is turned on, the restriction on clutch engagement is disabled as a result of a matching disable code and authentication code, and electrical power is then turned off and then on again within a predetermined time, the vehicle can be started even if the start restriction mode is enabled. Thus, in addition to the advantages provided by the first aspect of the invention, it is possible to stop the engine and then immediately restart the vehicle without using the mobile terminal even if the start restriction mode is enabled, as long as electrical power is turned back on within a predetermined time. In addition, the theft-prevention function can be kept active by only allowing the restarting of the vehicle within a predetermined time.

According to the sixth aspect of the invention, if electrical power is turned on, the restriction on clutch engagement is disabled as a result of a matching disable code and authentication code, and electrical power is then turned off and then on again within a predetermined time, the vehicle can be started even if the start restriction mode is enabled. Thus, in addition to the advantages provided by the second aspect of the invention, it is possible to stop the engine and then immediately restart the vehicle without using the mobile terminal even if the start restriction mode is enabled, as long as electrical power is turned back on within a predetermined time. In addition, the theft-prevention function can be maintained by restricting the restarting of the vehicle to within a predetermined time.

According to the seventh aspect of the invention, if electrical power is turned on, the restriction on clutch engagement is disabled as a result of a matching disable code and authentication code, and electrical power is then turned off and then on again within a predetermined time, the vehicle can be started even if the start restriction mode is enabled. Thus, in addition to the advantages provided by the third aspect of the invention, it is possible to stop the engine and then immediately restart the vehicle without using the mobile terminal even if the start restriction mode is enabled, as long as electrical power is turned back on within a predetermined time. In addition, the theft-prevention function can be maintained by restricting the restarting of the vehicle to within a predetermined time.

According to the eighth aspect of the invention, if electrical power is turned on, the restriction on clutch engagement is disabled as a result of a matching disable code and authentication code, and electrical power is then turned off and then on again within a predetermined time, the vehicle can be started even if the start restriction mode is enabled. Thus, in addition to the advantages provided by the fourth aspect of the invention, it is possible to stop the engine and then immediately restart the vehicle without using the mobile terminal even if the start restriction mode is enabled, as long as electrical power is turned back on within a predetermined time. In addition, the theft-prevention function can be maintained by restricting the restarting of the vehicle to within a predetermined time.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

Reference will now be made to the accompanying drawings which illustrate exemplary embodiments of the present disclosure. In the drawings.

DESCRIPTION OF EXEMPLARY EMBODIMENTS

Reference will now be made in detail to several exemplary embodiments of the present disclosure, including those illustrated in the accompanying drawings.

Whenever possible, the same reference numbers will be used throughout the drawings to refer to the same or like parts.

An embodiment of the present invention will be described in detail using the drawings.

Figure 1:
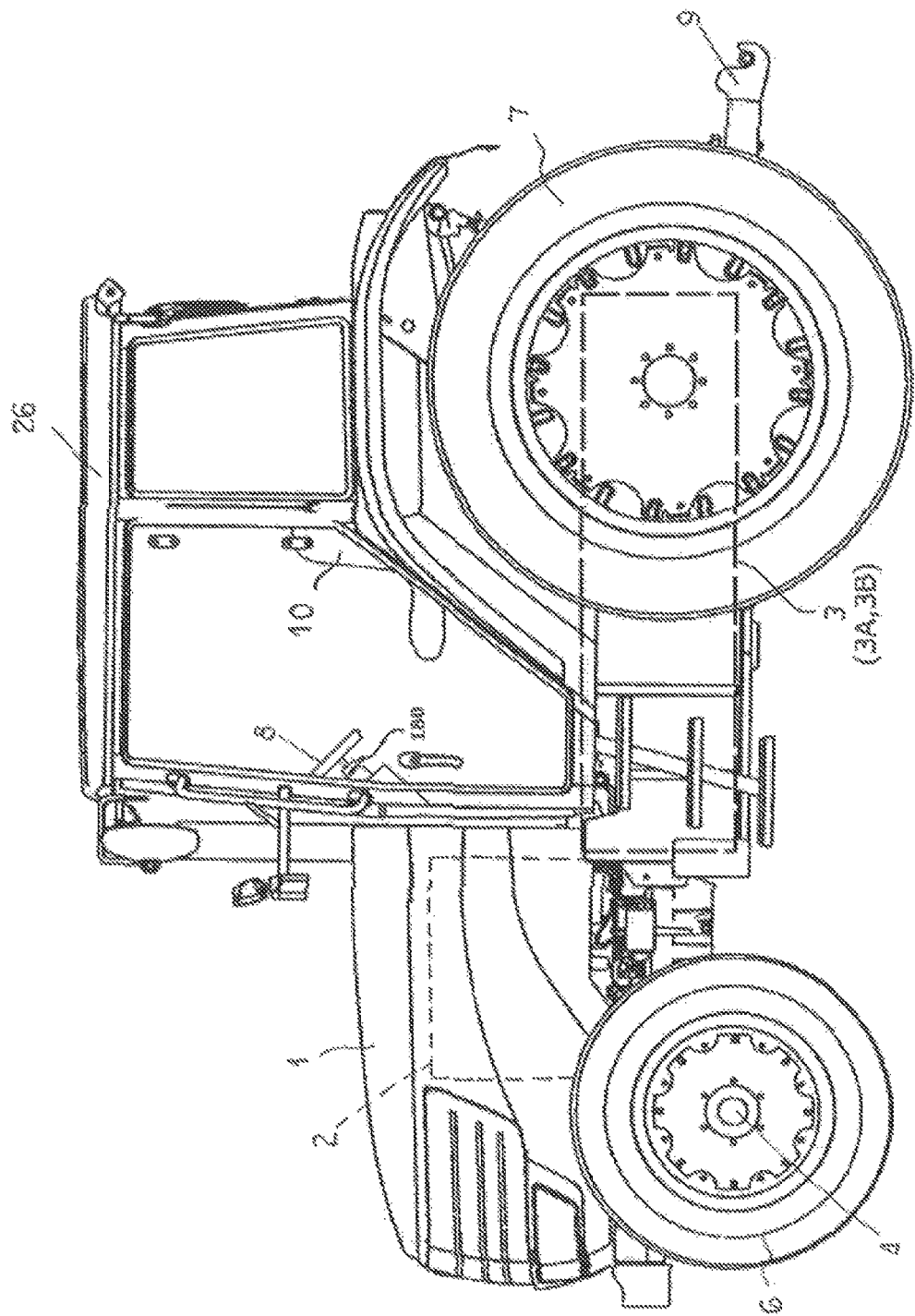
FIG. 1 is a side view of the entire tractor according to one embodiment.

FIG. 1 is a side-view drawing showing the entirety of a tractor that serves as an example of the work vehicle in the present invention. A common-rail diesel engine 2 installed in a bonnet 1 at the front of a vehicle body generates drive force. The drive force is subjected, as appropriate, to a speed change in a fixed PTO shaft rotation transmission case 3A or a vehicle-speed-adaptive PTO shaft rotation transmission case 3B and is transmitted to a front wheel shaft 4 and a rear wheel shaft 5 to drive either both front wheels 6 and rear wheels 7 or just the rear wheels 7. An operator who is seated in a seat 10 provided in a cabin 26 above the vehicle body operates a centrally projected steering wheel 8 to drive the vehicle while steering the front wheels 6. An implement such as a rotary tiller is mounted to a lower link 9 projecting rearward from the vehicle, with the mounted implement being driven by a PTO shaft 11 projecting rearward from the transmission case 3A (3B).

Figure 2:
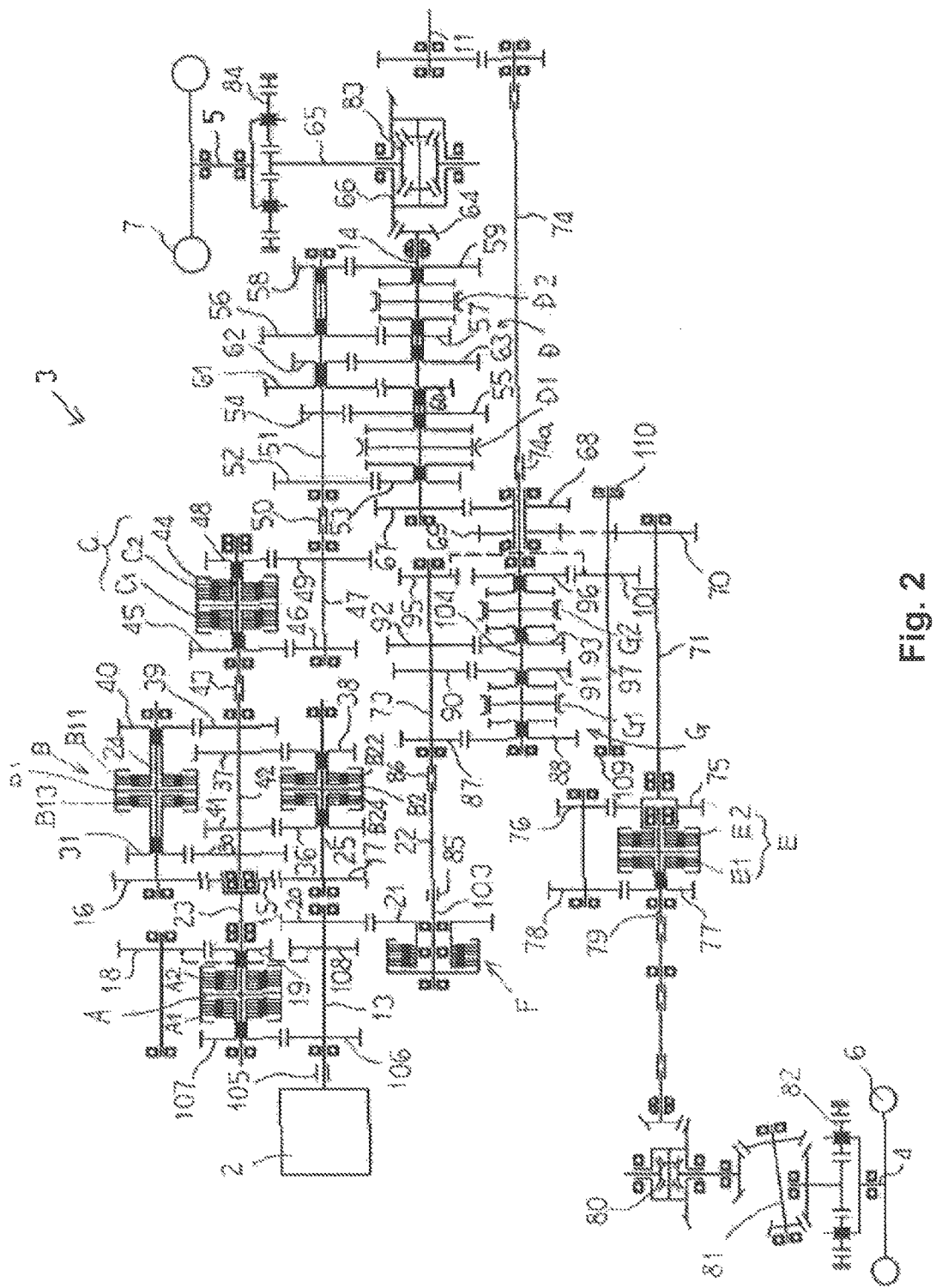
FIG. 2 is a schematic diagram of a fixed-speed PTO transmission case.

FIG. 2 is a power transmission schematic for the fixed-speed PTO shaft rotation transmission case 3A. Power is received by a main input shaft 13 from the output shaft of the engine 2 connected to a main coupling 105. The main input shaft 13 is secured to three gears, i.e., a first main gear 106, a second main gear 108, and a third main gear 20. Power is transmitted by: the first main gear 106, which meshes with a forward gear 107 of a forward/reverse clutch A; the second main gear 108, which meshes with a reverse gear 19 of the forward/reverse clutch A by way of a first counter gear 18; and the third main gear 20, which meshes with a PTO input gear 21 of a PTO clutch F.

Thus, a first main shaft 23 of the forward/reverse clutch A rotates in the forward direction when a forward clutch A1 of the forward/reverse clutch A is engaged, and the first main shaft 23 rotates in the reverse direction when a reverse clutch A2 is engaged. When the PTO clutch F is engaged, a PTO clutch shaft 103 rotates.

A hydraulic fluid is supplied to the forward/reverse clutch A by way of a forward/reverse switching solenoid 150 and a forward/reverse step-up solenoid 151. The forward/reverse switching solenoid 150 switches hydraulic paths so that hydraulic fluid is supplied to the forward clutch A1 or the reverse clutch A2 or neither clutch.

The forward/reverse step-up solenoid 151 is implemented using a proportional control valve in which the valve setting can be freely adjusted through the balance between an electromagnetic force proportional to the current flowing through a coil and the elastic force of a spring inside the valve mechanism. This valve adjusts the relief pressure of the hydraulic fluid supply path to reduce the engagement shock of the forward clutch A1 and the reverse clutch A2.

If, during normal operation, a forward/reverse lever 180 is shifted to the forward position, a forward/reverse lever operation position sensor 146 reads the position of the lever and sends it to a drive system controller 149. On the basis of this value, the travel system controller 149 switches the forward/reverse switching solenoid 150 so that the hydraulic fluid is supplied to the forward clutch A1 and adjusts the current to the forward/reverse step-up solenoid 151.

Conversely, if the forward/reverse lever 180 is shifted to the reverse position, the forward/reverse lever operation position sensor 146 reads the position of the lever and sends it to the drive system controller 149. On the basis of this value, the drive system controller 149 switches the forward/reverse switching solenoid 150 so that the hydraulic fluid is supplied to the reverse clutch A2 and adjusts the current to the forward/reverse step-up solenoid 151.

Furthermore, if the forward/reverse lever 180 is put in neutral, the forward/reverse lever operation position sensor 146 reads the position of the lever and sends it to the drive system controller 149. On the basis of this value, the drive system controller 149 switches the forward/reverse switching solenoid 150 so that hydraulic fluid is not supplied to either side, with the elastic force of the spring inside the forward/reverse clutch A maintaining a neutral state.

In this manner, the forward/reverse clutch A, which corresponds to the clutch in the present invention, is able to freely control the connection and disconnection of the drive force using the drive system controller 149.

When clutch engagement is restricted in the present invention, the forward/reverse clutch A is kept in neutral regardless of the value of the forward/reverse lever operation position sensor 146.

When the forward/reverse clutch A is in neutral, the rotation of the forward gear 107 and the reverse gear 19 is not transmitted to the first main shaft 23 and the rotational drive from the engine 2 is disengaged.

The rotation of the first main shaft 23 undergoes a speed change at a primary transmission device BC, formed from a four-speed clutch B and a high/low switching clutch C, and a mechanical four-speed clutch D serving as a secondary transmission device D. The rotation is then transmitted to a bevel gear shaft 14, which serves as a final drive transmission shaft, thus providing 32 speeds (4×2×4=32). A speed-increasing clutch E enables the front wheels 6 driven by the bevel gear shaft 14 to rotate faster than the rear wheels 7.

The rotation of the PTO clutch shaft 103, which is driven by the main input shaft 13 by way of the third main gear 20 and the PTO input gear 21, is transmitted from the PTO clutch F to a first PTO shaft 22, and a PTO transmission mechanism G provides three forward speeds and one reverse speed.

The power transmission mechanism will be described in detail.

The rotation of the first main shaft 23 transmitted by way of the forward/reverse clutch A (the forward clutch A1 and the reverse clutch A2) is then transmitted by a first gear 15 engaging a first transmission gear 16, which is secured to a first transmission shaft 24 mounted to a first/third-speed clutch B1 of the four-speed clutch B, and a second transmission gear 17, which is secured to a second transmission shaft 25 mounted to a second/fourth-speed clutch B2 of the four-speed clutch B.

The rotation of the first transmission shaft 24 and the second transmission shaft 25 is transmitted in the following manner: when the first-speed clutch B11 is engaged, the second main shaft 42 is rotated by power transmitted from a seventh gear 40 to a sixth gear 39, which forms a spline fit with the second main shaft 42; when the second-speed clutch B22 is engaged, the second main shaft 42 is rotated by power transmitted from a ninth gear 38 to an eighth gear 37, which forms a spline fit with the second main shaft 42; when the third-speed clutch B13 is engaged, the second main shaft 42 is rotated by power transmitted from an eleventh gear 31 to a tenth gear 30, which forms a spline fit with the second main shaft 42; and, when the fourth-speed clutch B24 is engaged, the second main shaft 42 is rotated by power transmitted from a thirteenth gear 36 to a twelfth gear 41, which forms a spline fit with the second main shaft 42.

Signals from the drive system controller 149 control the engagement and disengagement of the first-speed clutch B11 by way of a first transmission speed solenoid 153, the third-speed clutch B13 by way of a third transmission speed solenoid 154, the second-speed clutch B22 by way of a second transmission speed solenoid 155, and the fourth-speed clutch B24 by way of a fourth transmission speed solenoid 156. When all four of these clutches are disengaged, the rotational power of the engine 2 is cut off, and in this case this four-speed clutch B corresponds to the clutch in the present invention.

The rotation of a second main shaft 42 is transmitted to a high/low switching shaft 44 by way of a first coupling 43. When a high-speed clutch C1 of the high/low switching clutch C is engaged, power is transmitted from a high-speed clutch gear 45 to a fourteenth gear 46 of a first counter shaft 47. When a low-speed clutch C2 of the high/low switching clutch C is engaged, power is transmitted from a low-speed clutch gear 48 to a sixteenth gear 49 of the first counter shaft 47.

Since the high/low switching clutch C is provided on the drive-side shaft, the inertial rotation force of the high/low switching clutch C is kept low when a speed change is performed with the mechanical four-speed clutch D, thus providing good synchronization for the mechanical four-speed clutch D.

In addition, since the high/low switching clutch C is provided between the four-speed clutch B and the mechanical four-speed clutch D, dual-clutching is performed on the four-speed clutch B to stop inertial rotation and the high/low switching clutch C is disengaged, thus providing good synchronization for the mechanical four-speed clutch D and enabling efficient speed changes.

Signals from the drive system controller 149 control the engagement and disengagement of the high-speed clutch C1 by way of a high-speed clutch solenoid 157 and the low-speed clutch C2 by way of a low-speed clutch solenoid 158. When both clutches are disengaged, the rotational power of the engine 2 is cut off, and in this case this high/low switching clutch C corresponds to the clutch in the present invention.

The rotation of a first counter shaft 47 is transmitted to a second counter shaft 51 by way of a second coupling 50. When a mechanical four-speed clutch D1 of the mechanical four-speed clutch D is switched to an eighteenth gear 53, the rotation is transmitted from a seventeenth gear 52 to the eighteenth gear 53 and the mechanical high-speed clutch D1 drives the bevel gear shaft 14 at a high speed.

When the mechanical high-speed clutch D1 of the mechanical four-speed clutch D is switched to a twentieth gear 55, the rotation is transmitted from a nineteenth gear 54 to the twentieth gear 55, and the mechanical high-speed clutch D1 drives the bevel gear shaft 14 at a medium speed.

When a mechanical low-speed clutch D2 is switched to a twenty-second gear 57, the rotation is transmitted from the nineteenth gear 54 to the twentieth gear 55, from a twenty-fifth gear 60 to a twenty-sixth gear 61, and from a twenty-seventh gear 62 to a twenty-eighth gear 63, resulting in the mechanical low-speed clutch D2 driving the bevel gear shaft 14 at a low speed.

When the mechanical low-speed clutch D2 is switched to a twenty-fourth gear 59, the rotation is transmitted from the nineteenth gear 54 to the twentieth gear 55, from the twenty-fifth gear 60 to the twenty-sixth gear 61, from the twenty-seventh gear 62 to the twenty-eighth gear 63, from the twenty-second gear 57 to the twenty-first gear 56, and from the twenty-third gear 58 to the twenty-fourth gear 59, resulting in the mechanical low-speed clutch D2 driving the bevel gear shaft 14 at a very low speed.

The twenty-first gear 56 and the twenty-sixth gear 61 are loosely fitted to the second counter shaft 51 so that the bevel gear shaft 14 and the second counter shaft 51 form a dual-axis configuration, thus providing a space-saving design for the mechanical four-speed clutch D.

In addition, since the seventeenth gear 52, the nineteenth gear 54, the twenty-sixth gear 61, the twenty-seventh gear 62, the twenty-first gear 56, and the twenty-third gear 58 are provided on the second counter shaft 51, good synchronization is provided for the mechanical four-speed clutch D.

A first bevel gear 64 formed integrally with the bevel gear shaft 14 meshes with a second bevel gear 66 of a rear wheel drive shaft 65 so that the rotation of the bevel gear shaft 14 drives the rear wheel shaft 5, on which the rear wheels 7 are mounted, by way of a rear bevel gear set 83, the rear wheel drive shaft 65, and a rear planetary gear set 84.

In addition, a twenty-ninth gear 67, which forms a spline fit with the bevel gear shaft 14, meshes, by way of a thirtieth gear 68 and a thirty-first gear 69, with a thirty-second gear 70 secured to a first front-wheel drive shaft 71, thus driving the first front-wheel drive shaft 71 as well.

The speed-increasing clutch E is installed at the front shaft end of a first front-wheel drive shaft 71. When a same-speed clutch E2 is engaged, the rotation of the first front-wheel drive shaft 71 is transmitted directly to the second front-wheel drive shaft 79. When a speed-increasing clutch E1 is engaged, the speed of the rotation of the first front-wheel drive shaft 71 is increased by way of a thirty-third gear 75, a thirty-fourth gear 76, a thirty-fifth gear 77, and a thirty-sixth gear 78, and the resulting rotation is transmitted to the second front-wheel drive shaft 79.

As in conventional configurations, the end of the second front-wheel drive shaft 79 drives the front wheel shaft 4 on which the front wheels 6 are mounted by way of a front bevel gear set 80, a front-longitudinal drive shaft 81, and a front planetary gear set 82.

When the PTO clutch F is engaged, the rotation of the PTO input gear 21 is transmitted from the PTO clutch shaft 103 to a second PTO shaft 73 by way of a third coupling 85, the first PTO shaft 22, and a fourth coupling 86.

A PTO clutch shaft 104 extending parallel to the second PTO shaft 73 is provided with a first PTO transmission clutch G1 and a second PTO transmission clutch G2, which form a PTO transmission mechanism G. When the first PTO transmission clutch G1 is engaged toward a thirty-eighth gear 88, the rotation of the second PTO shaft 73 is transmitted at a low speed to the PTO clutch shaft 104 by way of a thirty-seventh gear 87 and the thirty-eighth gear 88. When the first PTO transmission clutch G1 is engaged toward a fortieth gear 91, the rotation of the second PTO shaft 73 is transmitted at a medium speed to the PTO clutch shaft 104 by way of a thirty-ninth gear 90 and the fortieth gear 91. When the second PTO transmission clutch G2 is engaged toward a forty-second gear 93, the rotation of the second PTO shaft 73 is transmitted to the PTO clutch shaft 104 at a high speed by way of a forty-first gear 92 and the forty-second gear 93. When the second PTO transmission clutch G2 is engaged toward a forty-fourth gear 96, the rotation of the second PTO shaft 73 is transmitted as a reverse rotation to the PTO clutch shaft 104 by way of a forty-third gear 95, a forty-fifth gear 101, and the forty-fourth gear 96.

Figure 3:
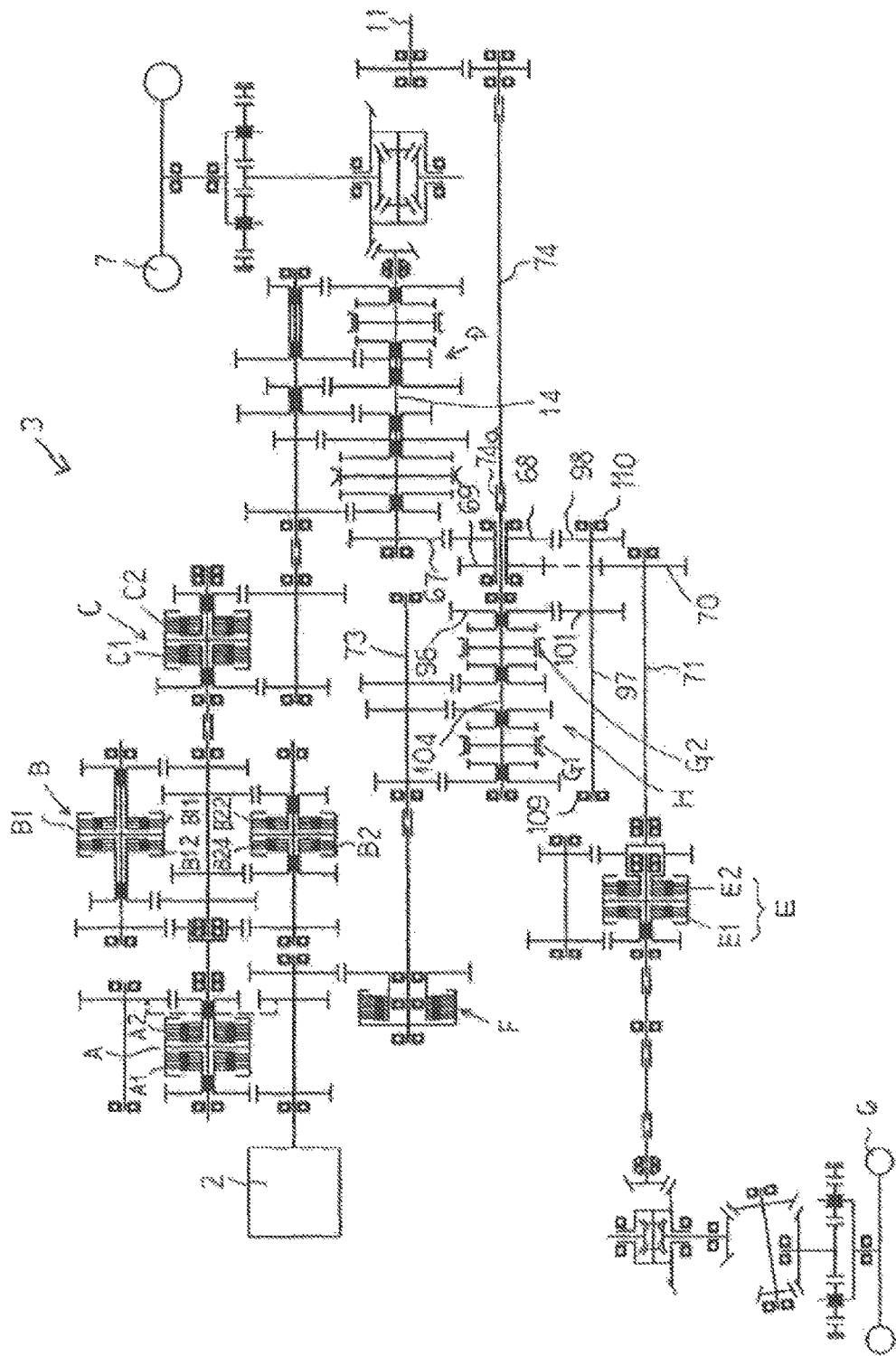
FIG. 3 is a schematic diagram of a vehicle-speed-adaptive PTO rotation transmission case.

FIG. 3 shows the vehicle-speed-adaptive PTO shaft rotation transmission case 3B, in which the PTO transmission mechanism G of the fixed PTO shaft rotation transmission case 3A is partially modified.

The forty-third gear 95 of the second PTO shaft 73 which meshes with the forty-fifth gear 101 is eliminated, and a forty-sixth gear 98 meshes with the thirtieth gear 68, thus transmitting the rotation of the bevel gear shaft 14 to the counter shaft 97 secured to the forty-fifth gear 101. When the second PTO transmission clutch G2 is switched toward the forty-fourth gear 96, rotation is transmitted from the twenty-ninth gear 67 to the thirtieth gear 68, the forty-sixth gear 98, the forty-fifth gear 101, and the forty-fourth gear 96, thus providing travel-speed-adaptive PTO rotation (ground PTO), in which the speed of the PTO clutch shaft 104, i.e., the PTO shaft 11, varies according to changes in rotation of the bevel gear shaft 14.

The thirtieth gear 68, which receives the rotation from the twenty-ninth gear 67, and the thirty-first gear 69, which transmits rotation to the thirty-second gear 70, are formed integrally, and travel-speed-adaptive PTO rotation is provided by the meshing of the thirtieth gear 68 and the forty-sixth gear 98. As a result, this configuration serves as both the fixed-speed PTO shaft rotation transmission case 3A and the vehicle-speed-adaptive PTO shaft rotation transmission case 3B.

In addition, the thirtieth gear 68 and the thirty-first gear 69, which are integrated, form a loose fit with the PTO clutch shaft 104, thus providing a simplified configuration.

In the present invention, even if clutch engagement is restricted and travel is not possible, the engine can be started and a PTO clutch solenoid 152, which controls the supply of hydraulic fluid to the PTO clutch F, is not restricted. Thus, it is possible to operate an implement that is used without moving the work vehicle, i.e., a stationary implement that is PTO-driven (e.g., a power generator or a wood chipper).

Figure 4:
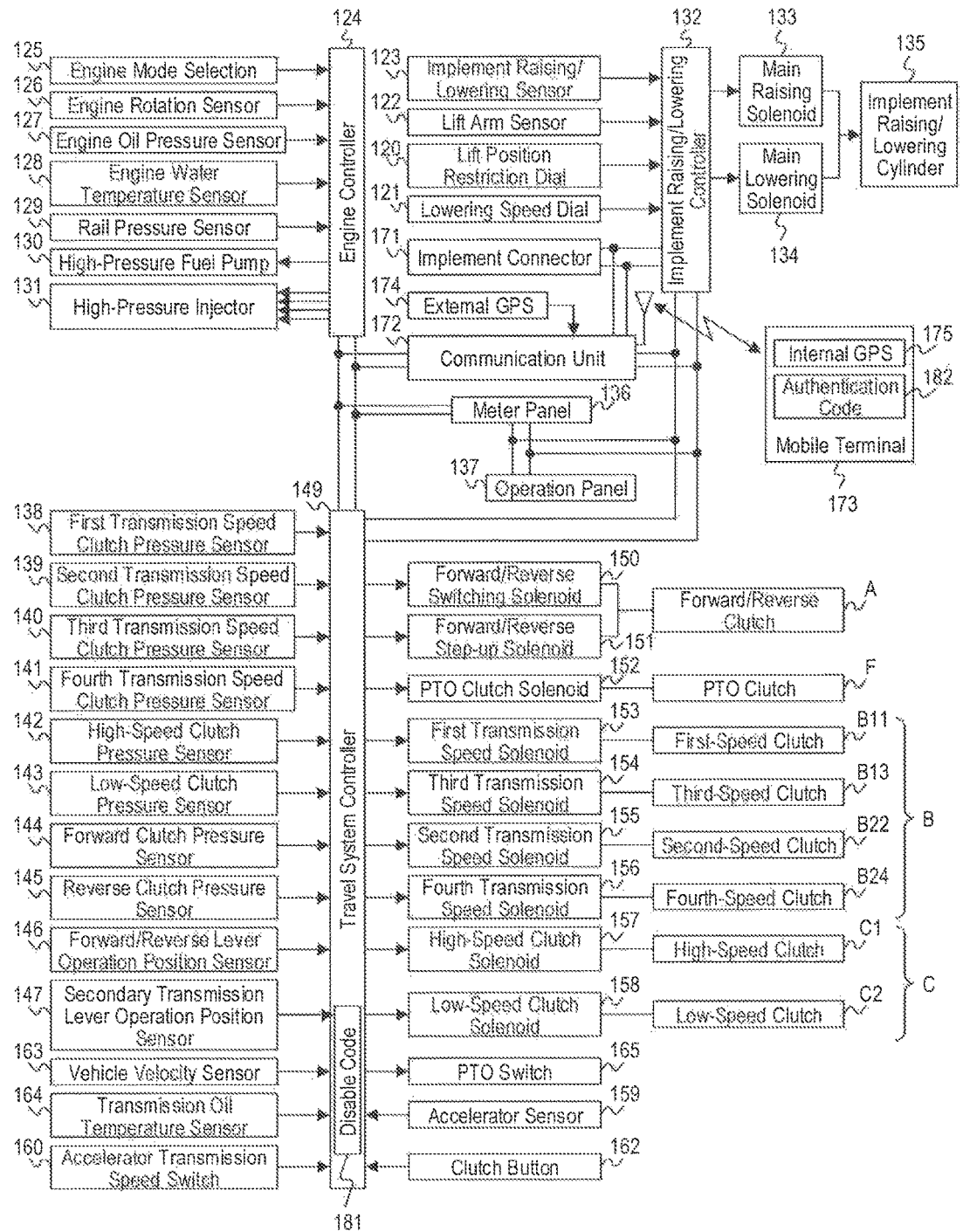
FIG. 4 is a control block diagram according to one embodiment.

Next, referring to the control block diagram in FIG. 4, the flow of control signals will be described.

First, an engine controller 124 receives: an engine mode from an engine mode selection switch 125; engine speed from an engine rotation sensor 126; engine lubrication oil pressure from an engine oil pressure sensor 127; cooling water temperature from an engine water temperature sensor 128; and common-rail pressure from a rail pressure sensor 129. The engine controller 124 outputs a drive signal to a high-pressure fuel pump 130 and a fuel supply adjustment control signal to a high-pressure injector 131.

Next, an implement raising/lowering controller 132 receives: an operation signal from an implement raising/lowering sensor 123 provided on an implement raising/lowering lever; a raising/lowering signal from a lift arm sensor 122; a lift position restriction signal from a lift position restriction dial 120; and a lowering speed setting signal from a lowering speed dial 121. The implement raising/lowering controller 132 outputs an implement raising/lowering signal to a main raising solenoid 133 and a main lowering solenoid 134 and activates an implement raising/lowering cylinder 135.

In addition, the implement raising/lowering controller is provided with an implement connector 171 and can perform bidirectional communication with the connected implement using a defined communication protocol.

An engine controller 124, an implement raising/lowering controller 132, a travel system controller 149, a communication unit 172, and a meter panel 136 each has information processing capabilities, communicates with each other bidirectionally, and implements functions of the control unit in the present invention.

These elements pass control signals among each other, and the meter panel 136 displays information such as engine state, the raising/lowering state of the implement, and the travel velocity of the travel device.

The communication unit 172 uses wireless communication to send and receive signals to and from a mobile terminal 173, e.g., a tablet or a smart phone. The vehicle is provided with an external GPS 174. If a signal is received therefrom, the information from the external GPS 174 is given priority over the information from an internal GPS 175 sent from the mobile terminal 173. If no signal is received from the external GPS 174, the information from the internal GPS 175 is used.

In addition, if a PTO operation instruction is received from the mobile terminal 173, remote control is possible, e.g., by operating the PTO clutch solenoid 152 by way of the travel system controller.

The travel system controller 149 receives: clutch input signals, i.e., the transmission speed of the mechanical four-speed clutch D, from a first transmission speed clutch pressure sensor 138, a second transmission speed clutch pressure sensor 139, a third transmission speed clutch pressure sensor 140, and a fourth transmission speed clutch pressure sensor 141; the transmission setting of the mechanical four-speed clutch D from a high-speed clutch pressure sensor 142 and a low-speed clutch pressure sensor 143; the forward/neutral/reverse setting of the forward/reverse clutch A from a forward clutch pressure sensor 144 and a reverse clutch pressure sensor 145; a transmission operation position signal, which identifies the position of the forward/reverse lever 180, from a forward/reverse lever operation position sensor 146 and a secondary transmission lever operation position sensor 147; and an accelerator instruction signal from an accelerator sensor 159 of a throttle lever.

The travel system controller 149 also receives: travel velocity from a vehicle velocity sensor 163; oil temperature from a transmission oil temperature sensor 164, which also serves as an oil temperature sensor for the hydraulic fluid; a switching signal for the mechanical four-speed clutch D from a clutch button 162; and a switching signal for the PTO clutch F from a PTO switch 165.

The travel system controller 149 outputs: a switching signal for a forward/reverse switching clutch A to the forward/reverse switching solenoid 150; a relief pressure adjustment signal for the forward/reverse clutch hydraulic fluid supply path to the forward/reverse step-up solenoid 151 in order to reduce clutch engagement shock; an on/off signal to the PTO clutch solenoid 152; a first-speed control signal to a first transmission speed solenoid 153, which controls a hydraulic cylinder that activates/disables the first speed of the first/third-speed clutch B1; a third-speed control signal to a third transmission speed solenoid 154 that controls a hydraulic cylinder that activates/disables the third speed; a second-speed control signal to a second transmission speed solenoid 155 that controls a hydraulic cylinder that activates/disables the second speed of the second/fourth-speed clutch B2; a fourth-speed control signal to a fourth transmission speed solenoid 156 that controls a hydraulic cylinder that activates/disables the fourth speed; and a high-speed clutch "on" signal and a low-speed clutch "on" signal to the low-speed clutch solenoid 158, which activates a hydraulic cylinder for the low speed of the high/low switching clutch C, and the high-speed clutch solenoid 157, which activates a hydraulic cylinder for the high speed.

Figure 5:
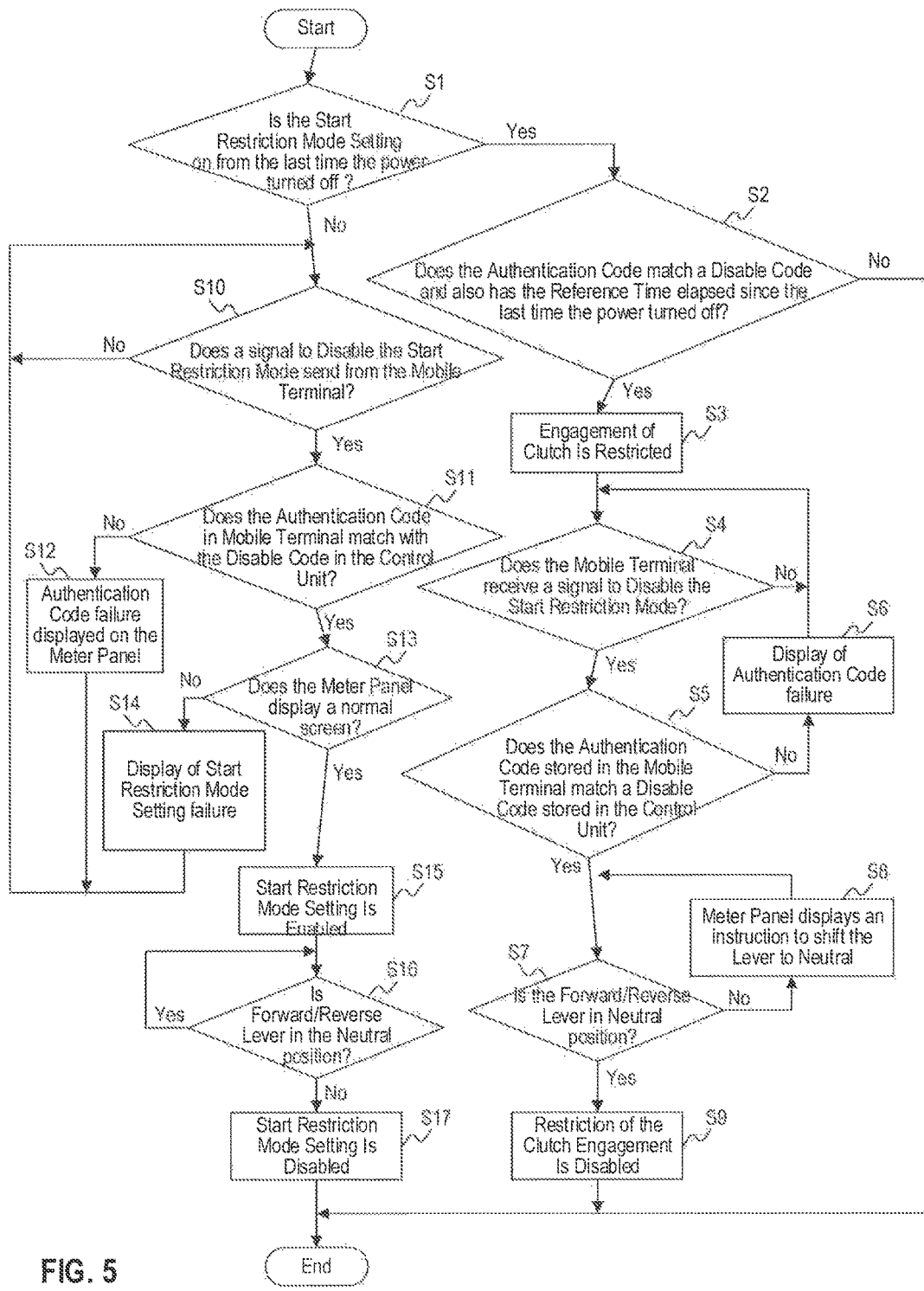
FIG. 5 is a control flow chart according to one embodiment.

FIG. 5 is a flow chart of a system that relates to enabling and disabling a start restriction mode. When power to the vehicle is turned on, the start restriction mode setting state from the last time the power was turned off is determined (step S1). If the start restriction mode is on, it is determined whether or not an authentication code 182 in the mobile terminal matched a disable code 181 stored in the control unit prior to the last time the power was turned off and whether or not a reference time has elapsed since the last time the power was turned off (step S2). If the authentication code 182 in the mobile terminal matched the disable code 181 stored in the control unit prior to the last time the power was turned off and a reference time has elapsed since the last time the power was turned off, engagement of the forward/reverse clutch A is restricted (step S3). Otherwise, the operation is terminated.

When engagement of forward/reverse clutch A is restricted, the control unit prevents current from flowing to the forward/reverse switching solenoid 150 and the forward/reverse step-up solenoid 151 even if the forward/reverse lever 180 is moved to the forward position or the reverse position. As a result, the forward/reverse clutch A stays in neutral with no power being transmitted.

If, when engagement of the forward/reverse clutch A is restricted, a signal to disable the start restriction mode is received from the mobile terminal 173 (step S4), the mobile terminal compares the authentication code 182 stored in the mobile terminal with the disable code 181 stored in the control unit (step S5). If the two codes do not match, an indication that code authentication failed is displayed on the mobile terminal 173 and the meter panel 136 (step S6). If a signal to disable the start restriction mode is not received or the authentication code 182 and the disable code 181 do not match, the operation to check for receipt of a start restriction mode disable signal is repeated.

If the authentication code 182 and the disable code 181 match, the position of the forward/reverse lever 180 is checked (step S7). If the lever is not in the neutral position, the meter panel 136 displays an instruction to shift the lever to neutral (step S8). If the lever is in the neutral position, restriction of the clutch engagement is disabled (step S9).

If it is determined that the start restriction mode setting was not enabled the last time the power was turned off (step S1), an operation to check for receipt of a signal to disable start restriction mode sent from the mobile terminal 173 is repeated (step S10), and, when the signal is received, the mobile terminal 173 compares the authentication code 182 in the mobile terminal 173 with the disable code 181 in the control unit (step S11). If the codes do not match, a message indicating code authentication failure is displayed on the meter panel (step S12), and control returns to the operation to check for receipt of a start restriction mode enable signal. If the codes match, it is determined whether or not the meter panel is displaying a normal screen, e.g., showing velocity and remaining fuel (step S13). If the panel is not displaying a normal screen, a message indicating that the start restriction mode cannot be enabled unless the normal screen is displayed (step S14), and control returns to the operation to confirm receipt of the start restriction mode enable signal.

If the meter panel 136 is displaying a normal screen, the start restriction mode setting is enabled (step S15), and the forward/reverse lever is checked to determine if it is in the neutral setting (step S16). If the lever is shifted to a setting other than neutral, the start restriction mode setting is disabled (step S17). When the start restriction mode is turned off automatically in this manner, it would be preferable to display a message on the meter panel 136 indicating that the mode has been automatically turned off. It would also be possible to have the mobile terminal 173 display a similar message.

Figure 6:
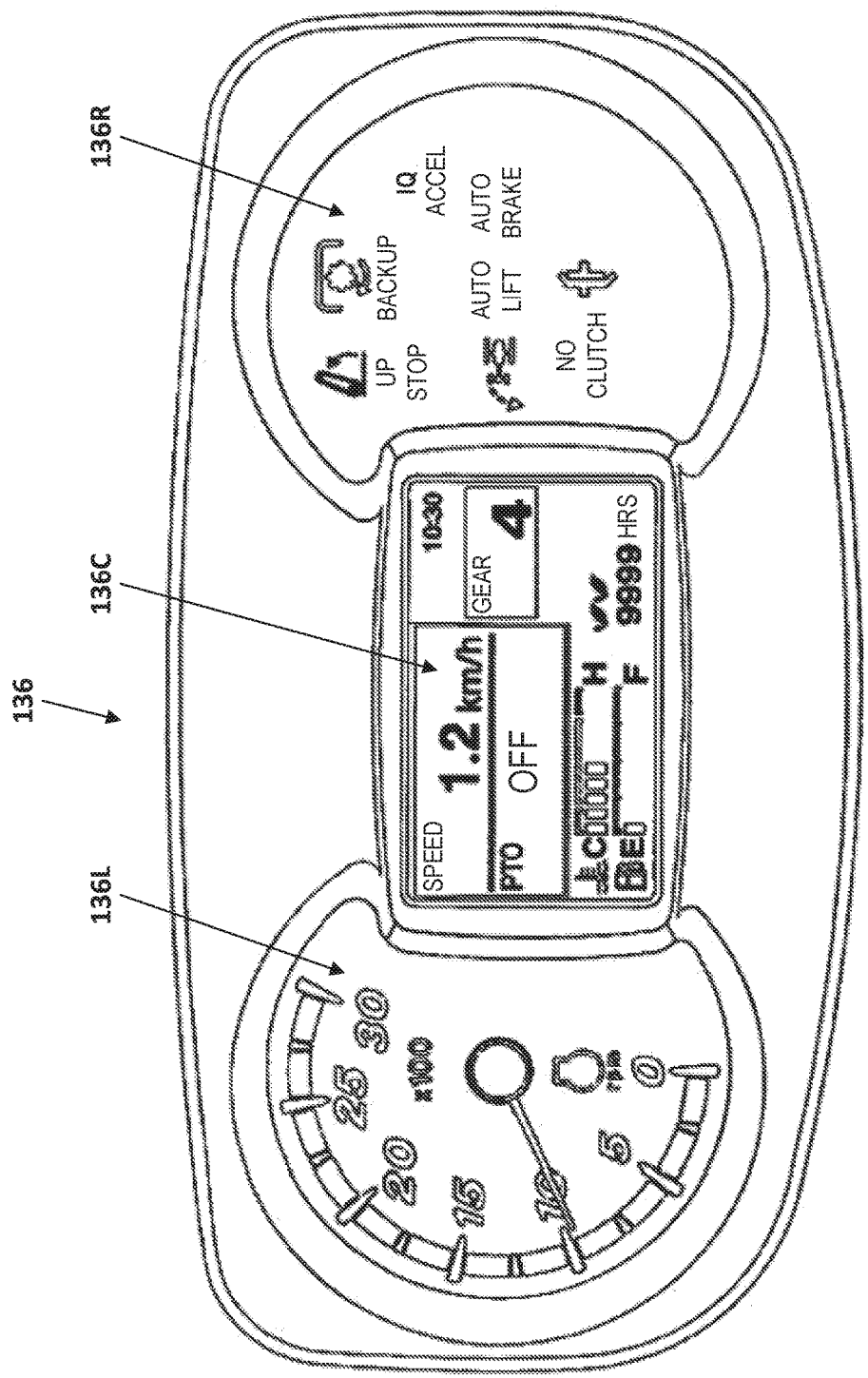
FIG. 6 is a front view of a meter panel according to one embodiment.

FIG. 6 is a front-view drawing of the meter panel 136. A liquid crystal screen unit 136C is provided at the center, a tachometer 136L is provided to the left, and a function display unit 136R that displays the on/off states of various functions is provided to the right. When showing the normal screen, the liquid crystal screen unit 136C displays drive-time information such as the vehicle velocity, the transmission setting, remaining fuel, and the total operation time. From this screen, it is possible to switch to another screen, e.g., to change LCD contrast settings and check for irregularity codes recorded when an irregularity occurs. The start restriction mode can only be enabled when the normal screen is displayed. This simplifies the software and minimizes memory usage.

Figure 7:
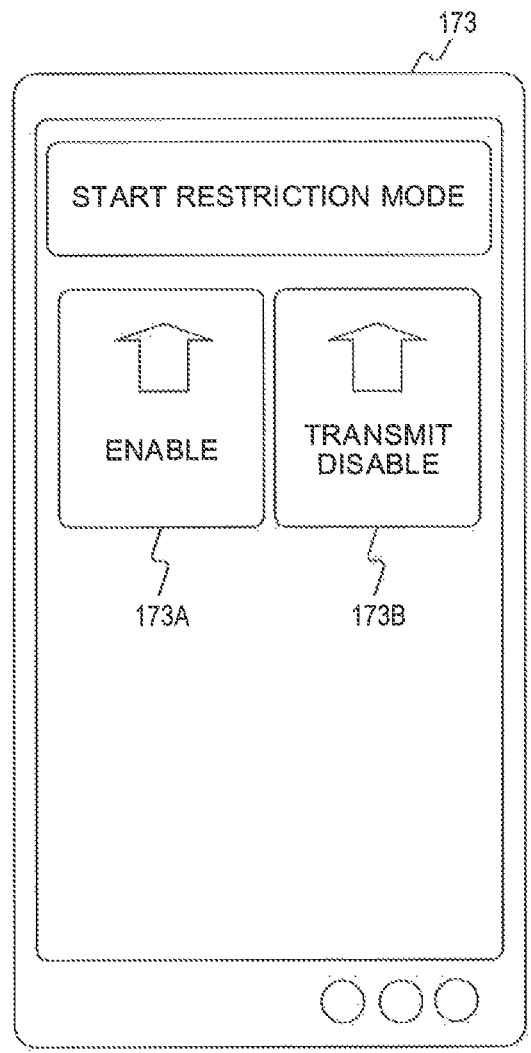
FIG. 7 is a front view of a mobile terminal screen according to one embodiment.

FIG. 7 shows the screen of the mobile terminal 173. When a dedicated application is installed, an enable button 173A and a transmit disable button 173B for the start restriction mode are displayed. Tapping either of these buttons sends a signal to the communication unit 172. When a start restriction mode enable or disable signal is received, the communication unit 172 sends the disable code 181 stored in the travel system controller to the mobile terminal 173, and the mobile terminal 173 compares the authentication code 182 and the disable code 181. If the codes match, a match confirmation signal is sent and the start restriction mode is enabled or disabled.

Figure 8:
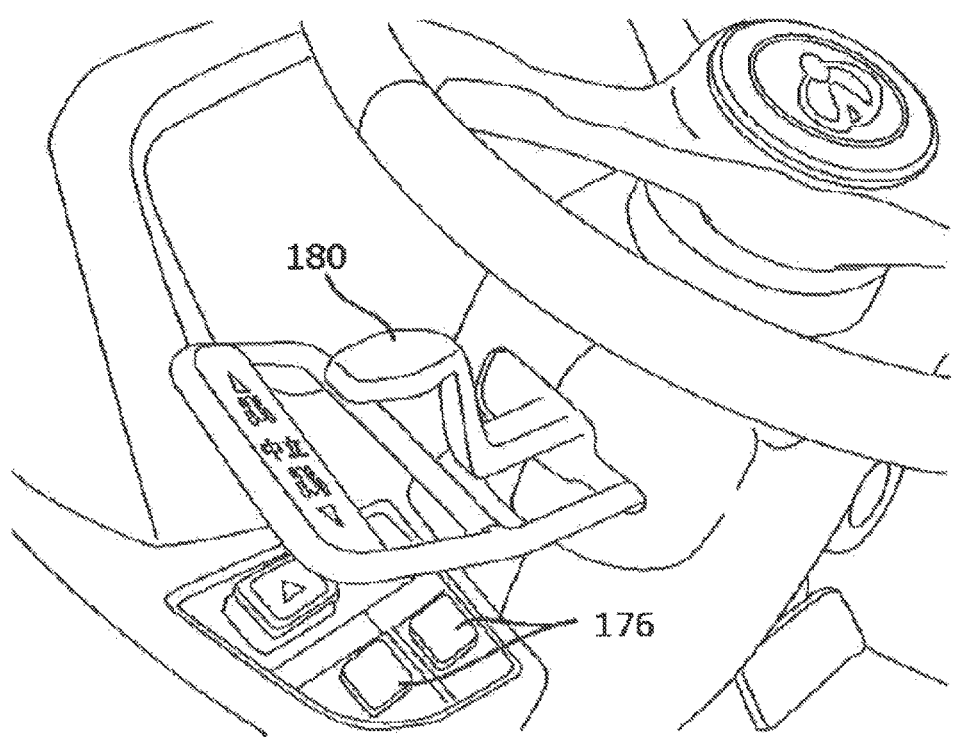
FIG. 8 is a perspective view of a forward/reverse lever and surrounding elements according to one embodiment.

FIG. 8 is a perspective drawing showing the forward/reverse lever 180 and surrounding elements. The operator uses the forward/reverse lever 180 below the steering wheel 8 to operate the forward/reverse clutch and can use internal switches 176 provided further below to enter various settings on the meter panel 136 of the work vehicle.

In this embodiment, the main target of the clutch engagement restriction is described as being the forward/reverse clutch A. However, it would also be possible to target the four-speed clutch B or the high/low clutch C as long as it is an electronically controlled clutch that can be set to neutral. The disable code 181 is described as being stored in the travel system controller, but similar advantages can be provided by storing the disable code 181 in the engine controller 124, the implement raising/lowering system controller 132, the meter panel 136, or the communication unit 172 as long as the element is equipped with a storage device and provides information processing functions.

In this embodiment, clutch engagement is restricted if the start restriction mode is enabled. The vehicle cannot be driven until the start restriction mode is disabled, thus preventing theft. Even if the start restriction mode is enabled, however, the engine can be started and engagement of the PTO clutch is not restricted. As a result, it is possible to perform work that does not involve vehicle travel, i.e., stationary work, without disabling the start restriction mode. Furthermore, since the driver may not be in the driver's seat during stationary work, restricting vehicle movement enables safer work.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A work vehicle, comprising:
   an engine;
   a power transmission device having a clutch for transmitting rotational power of the engine to drive wheels; and
   a travel control device for controlling the clutch in the power transmission device and having a start restriction mode for restricting engagement of the clutch when electrical power is turned on, wherein the clutch is a forward/reverse clutch operable by a forward/reverse lever; and, when disabling the start restriction mode, engagement of the clutch is restricted if the forward/reverse lever is in a forward or a reverse position.

2. The work vehicle of claim 1, wherein, if the start restriction mode is enabled when electrical power is on and the forward/reverse lever is subsequently operated to the forward or the reverse position before power is turned off, the start restriction mode is disabled.

3. The work vehicle of claim 1, wherein, if after electrical power is turned off electrical power is turned back on within a predetermined time, the clutch is engaged even if the start restriction mode is enabled.

4. The work vehicle of claim 2, wherein, if after electrical power is turned off electrical power is turned back on within a predetermined time, the clutch is engaged even if the start restriction mode is enabled.

5. A work vehicle, comprising:
   an engine;
   a power transmission device having a clutch for transmitting rotational power of the engine to drive wheels; and
   a travel control device for controlling the clutch in the power transmission device and having a start restriction mode for restricting engagement of the clutch when electrical power is turned on, wherein the clutch is a forward/reverse clutch operable by a forward/reverse lever; and, if the start restriction mode is enabled when electrical power is on and the forward/reverse lever is subsequently operated to the forward or the reverse position before electrical power is turned off, the start restriction mode is disabled.

6. The work vehicle of claim 5, wherein, if after electrical power is turned off electrical power is turned back on within a predetermined time, the clutch is engaged even if the start restriction mode is enabled.

7. A work vehicle, comprising:
an engine;
a power transmission device having a clutch for transmitting rotational power of the engine to drive wheels;
a travel control device for controlling the clutch in the power transmission device and having a start restriction mode for restricting engagement of the clutch when electrical power is turned on, wherein the clutch is a forward/reverse clutch operable by a forward/reverse lever and, when disabling the start restriction mode, engagement of the clutch is restricted if the forward/reverse lever is in a forward or a reverse position; and
a mobile terminal configured to transmit signals for enabling and disabling the start restriction mode, the travel control device configured to transmit and receive signals to and from the mobile terminal.

8. A work vehicle, comprising:
an engine;
a power transmission device having a clutch for transmitting rotational power of the engine to drive wheels;
a travel control device for controlling the clutch in the power transmission device and having a start restriction mode for restricting engagement of the clutch when electrical power is turned on, wherein the clutch is a forward/reverse clutch operable by a forward/reverse lever; and, if the start restriction mode is enabled when electrical power is on and the forward/reverse lever is subsequently operated to the forward or the reverse position before electrical power is turned off, the start restriction mode is disabled; and
a mobile terminal configured to transmit signals for enabling and disabling the start restriction mode, the travel control device configured to transmit and receive signals to and from the mobile terminal.

* * * * *